United States Patent [19]

McWilliams

[11] Patent Number: 5,460,431
[45] Date of Patent: Oct. 24, 1995

[54] DOUBLE TAPERED TRAILER FOR A DUMPING VEHICLE

[75] Inventor: Cliff McWilliams, Katy, Tex.

[73] Assignee: ABCM Industries Limited Partnership, Houston, Tex.

[21] Appl. No.: 84,713

[22] Filed: Jul. 1, 1993

[51] Int. Cl.[6] .................................................. B60P 1/18
[52] U.S. Cl. ............................ 298/22 AE; 298/22 D; 298/17 B
[58] Field of Search .................................. 296/183, 184; 298/21, 1 R, 1 B, 17 R, 22 R, 17 B, 22 AE, 22 D

[56] References Cited

U.S. PATENT DOCUMENTS

| | | |
|---|---|---|
| 1,627,336 | 5/1927 | Nelson . |
| 1,834,965 | 12/1931 | Osman .................. 298/17 R |
| 1,989,125 | 1/1935 | Atwell . |
| 2,974,997 | 3/1961 | Parsley et al. ............ 298/17 R |
| 3,094,351 | 6/1963 | Gwinn et al. ............. 296/184 |
| 3,134,628 | 1/1964 | Lackey . |
| 3,480,321 | 11/1969 | Brandt et al. ............. 296/184 |
| 3,729,230 | 4/1973 | Tomlinson, Jr. . |
| 4,883,321 | 11/1989 | Voigt . |
| 5,005,893 | 4/1991 | McCrary ................... 296/21 |
| 5,090,773 | 2/1992 | Guillaume . |

FOREIGN PATENT DOCUMENTS

| | | | |
|---|---|---|---|
| 1464476 | 11/1966 | France ..................... 296/184 |
| 346 | 7/1899 | Germany ................. 298/1 R |
| 691299 | 4/1963 | Italy ........................ 298/22 AE |

OTHER PUBLICATIONS

"Heil Bodies and Hoists", Mar. 1925, pp. 4–17.
La Rochelle Equipment, "Leaders in Quality Dump Trailers", pp. 1–4, Apr. 1990.

*Primary Examiner*—Michael S. Huppert
*Assistant Examiner*—Gregory A. Morse
*Attorney, Agent, or Firm*—Head & Johnson

[57] ABSTRACT

A trailer for a dumping vehicle having a front and a rear for unloading of materials. The trailer includes a tapered bottom floor extending between the front and the rear, the bottom floor at the rear being wider than at the front. A pair of opposed sidewalls extend from the bottom floor, each sidewall at an obtuse angle to the bottom floor.

3 Claims, 4 Drawing Sheets

DOUBLE TAPERED TRAILER FOR A DUMPING VEHICLE

BACKGROUND OF THE INVENTION

1. Field of the Invention

The present invention is directed to a trailer for a dumping vehicle that is tilted by raising the front of the trailer to dump the contents out of the rear. In particular, the present invention is directed to a trailer for a dumping vehicle wherein the sidewalls are at an obtuse angle to the bottom floor and wherein the bottom floor is tapered from front to rear so that the bottom floor at the rear is wider than the front to assist in dumping the contents of the trailer.

2. Prior Art

Trailers used to transport loads which may be tilted by raising the front end and dumping the contents out of the rear end by force of gravity are well known. These trailers are typically attached to trucks or other vehicle to haul the trailer and accompanying load. The trailer itself includes a front wall and sidewalls and may have a removable or swinging tail gate. The tail gate is closed during loading and transportation of the materials and is removed or opened to unload the materials.

During loading and transportation of the materials, the trailer is parallel with the ground. During unloading, the trailer is tilted so that the force of gravity will allow the materials to slide out of the rear. Unloading of certain types of materials, such as clay materials, wet sands, or limestone, is sometimes hampered by sticking or clogging of these materials in the trailer. Additionally, in cold conditions, as wet materials freeze, they have a greater tendency to stick or clog in the trailer.

Notwithstanding tilting of the trailer for unloading, the materials may remain lodged in the trailer. The problem is exacerbated by one common type of trailer design utilizing a hydraulic telescopic, lifting mechanism. In trailers having a hoist box, the trailer has a recess at the front end which extends into the trailer to provide a space for the hydraulic cylinder. The space between the hoist box and the sidewalls at the front of the trailer provides an additional space for materials to stick or become clogged.

In order to overcome these problems, a number of measures may be taken. The clogged materials may manually be dislodged from the trailer although this requires additional labor and is time consuming. The trailer may be tilted farther than normal from the horizontal position to encourage the materials to become dislodged. While this is sometimes successful, it requires extra time and expense to tilt the trailer past the normal dumping angle. Additionally, when the trailer is tilted it is at risk to become unstable because the materials that are clogged in the trailer may be off center.

Others have addressed this problem in the past. Both Nelson (U.S. Pat. No. 1,627,336) and Atwell (U.S. Pat. No. 1,989,125) provide a dumping trailer that is wider at the rear than at the front to encourage removal of the materials by gravity. Voight (U.S. Pat. No. 4,883,321) provides a V-shaped floor and Guillaume (U.S. Pat. No. 5,090,773) provides a polygonal floor and sidewalls.

There remains, however, a need to provide a trailer that will encourage the unloading by gravity of wet or otherwise sticking or clogging materials and at the same time encourage the load to remain centered at all times.

It is, therefore, an object and purpose of the present invention to provide a trailer for a dumping vehicle having a configuration that will encourage the unloading of clogging or sticking materials.

It is a further object and purpose of the present invention to provide a trailer for a dumping vehicle having a tapered bottom floor that is wider at the rear than at the front and having a pair of opposed sidewalls that each extend upward from the bottom floor at an obtuse angle to the floor.

SUMMARY OF THE INVENTION

The present invention provides a trailer for a dumping vehicle capable of holding and transporting various materials including loose materials such as clay, sand, limestone, gravel and stone. The trailer includes a rear end supported by a plurality of rear wheels and an opposed front end. During loading and transportation of materials in the trailer, it is substantially parallel with the ground. To empty the contents, the trailer is placed in angular relation to the ground so that the contents slide and are emptied by force of gravity.

The trailer includes a flat bottom floor which supports the load of materials to be transported. The trailer includes a front wall extending upward from the bottom floor. Opposed to the front wall is a rear tail gate extending from the bottom floor. The tail gate is hinged to the trailer at the top or bottom of the trailer so that it will swing open for unloading.

The trailer also includes a pair of opposed sidewalls extending upward from the bottom floor. The bottom floor, the front wall, the rear tail gate and the side walls form an open top container for the receipt of the materials to be transported. The trailer includes a truck cab and wheels that support a frame and a coupler to connect to the trailer. The trailer includes a lifting mechanism having a hydraulic telescoping cylinder which is operated by controls on the truck. The bottom floor of the trailer contains a recess near the front end to receive the top of the cylinder. The recess in the bottom floor has a corresponding enclosure or hoist box that extends into the trailer.

For stability, a pair of lift arms extends between the bottom of the truck hoist and the center bottom of the floor. Lift arms are pivotally connected to both the frame and the bottom floor to accommodate the lifting and lowering of the trailer. The trailer tilts about the rear axle of the rear wheels 16 which forms a transverse axis.

The bottom floor is tapered between the front end and the rear end. The bottom floor is wider at the rear end than at the front end. The bottom floor is narrowest at the front end and tapers gradually to a wider floor area at the rear end. By use of the tapered bottom floor, the load in the trailer is encouraged to slide out of the rear end.

The sidewalls extend upward from the bottom floor having an obtuse angle to the bottom floor at an obtuse angle to the bottom floor.

The combination of the two angles, the tapered bottom floor from front to rear and the obtuse angled sidewalls promote centering of the load and also encourage dumping of the load by force of gravity.

DETAILED DESCRIPTION OF THE PREFERRED EMBODIMENT

Figure 1:
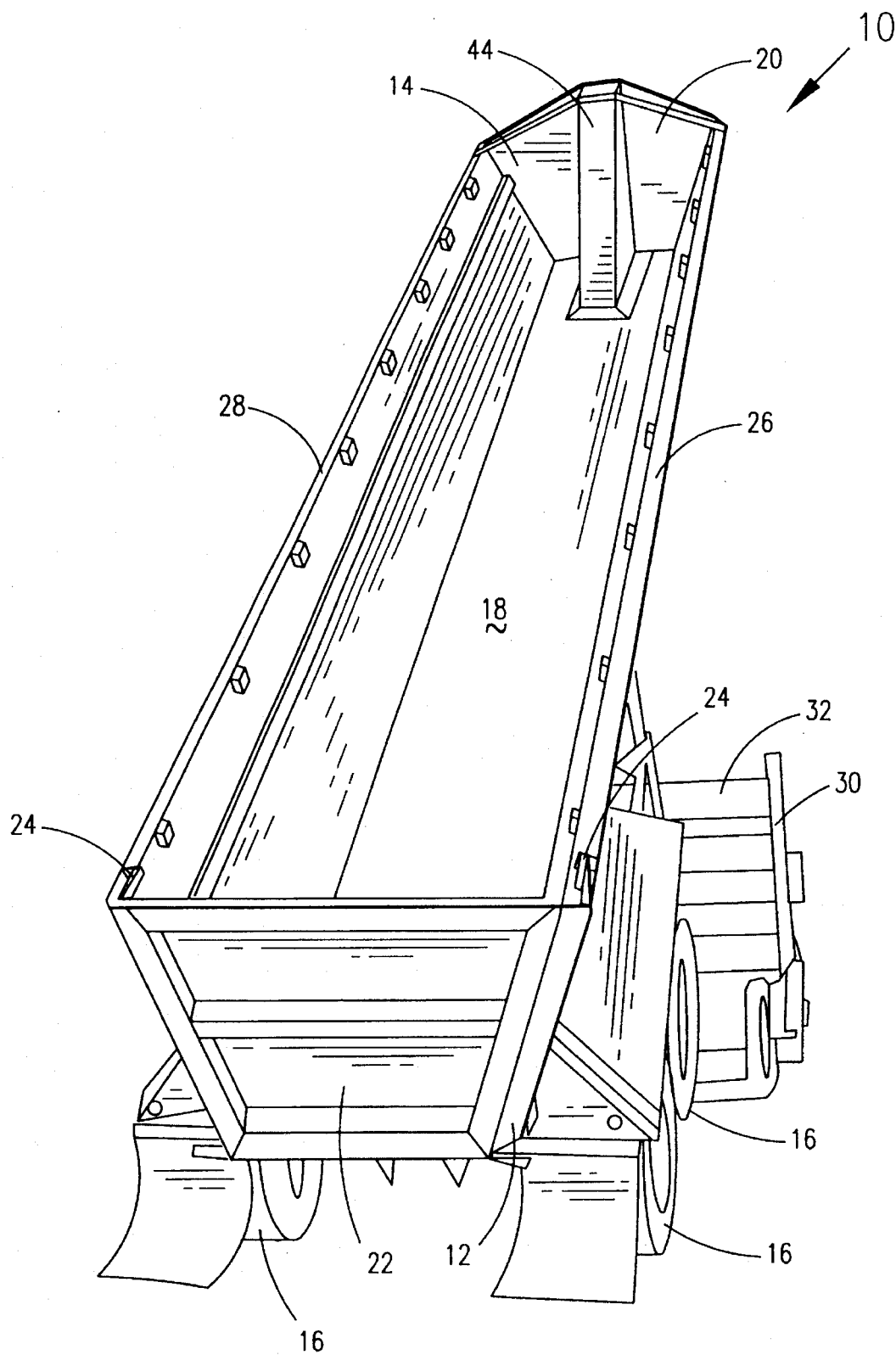
FIG. 1 is a perspective view of a double tapered trailer for a dumping vehicle constructed in accordance with the present invention, with the trailer in the raised or lifted position.

Referring to the drawings in detail, FIG. 1 is a perspective view of a trailer 10 shown from behind the rear end 12 of the trailer. The trailer, shown unloaded, is capable of holding and transporting a wide variety of materials. The trailer has particular application for loose materials, such as clay materials, sand, limestone, gravel, and stone. The trailer may be built to various dimensions. In one embodiment, the trailer has a cubic capacity of up to 49 yards and has a rated carrying capacity of up to 80,000 pounds. The trailer may be constructed of aluminum alloy, steel or other sturdy materials.

Opposed to the rear end 12 of the trailer is a front end 14. The trailer is supported at its rear end 12 by a plurality of rear wheels 16. A single pair of wheels may be utilized or multiple pairs of wheels may be provided. As will be appreciated from the discussion herein, the axle of one pair of the rear wheels serves as the transverse axis about which the trailer is lifted and tilted.

During loading of the trailer and during transportation of the materials, the trailer 10 is substantially parallel to the ground. In FIG. 1, the trailer is empty but has been illustrated in the lifted or raised position wherein the trailer is in angular relation to the ground.

The trailer 10 includes a flat bottom floor 18 which supports the load of materials to be placed in the trailer. The trailer 10 also includes a front wall 20 extending upward from the bottom floor 18. Opposed to the front wall 20 is a rear tail gate 22 extending from the bottom floor. In FIG. 1, the tail gate is in the closed position. The rear tail gate 22 will remain in the closed position during loading or transportation of materials. While it is possible to remove the tail gate to unload the materials, the tail gate is hinged to the trailer 10 at the top of the sides so that it will swing open for unloading. The trailer is also provided with top hinges 24 to retain the tail gate in a closed position.

The trailer also includes a pair of opposed sidewalls 26 and 28. Each sidewall 26 and 28 extends upward from the bottom floor 18 of the trailer. Accordingly, the bottom floor 18, the front wall 20, the rear tail gate 22 and the sidewalls 26 and 28 form an open top container for the receipt of the materials to be transported.

Figure 2:
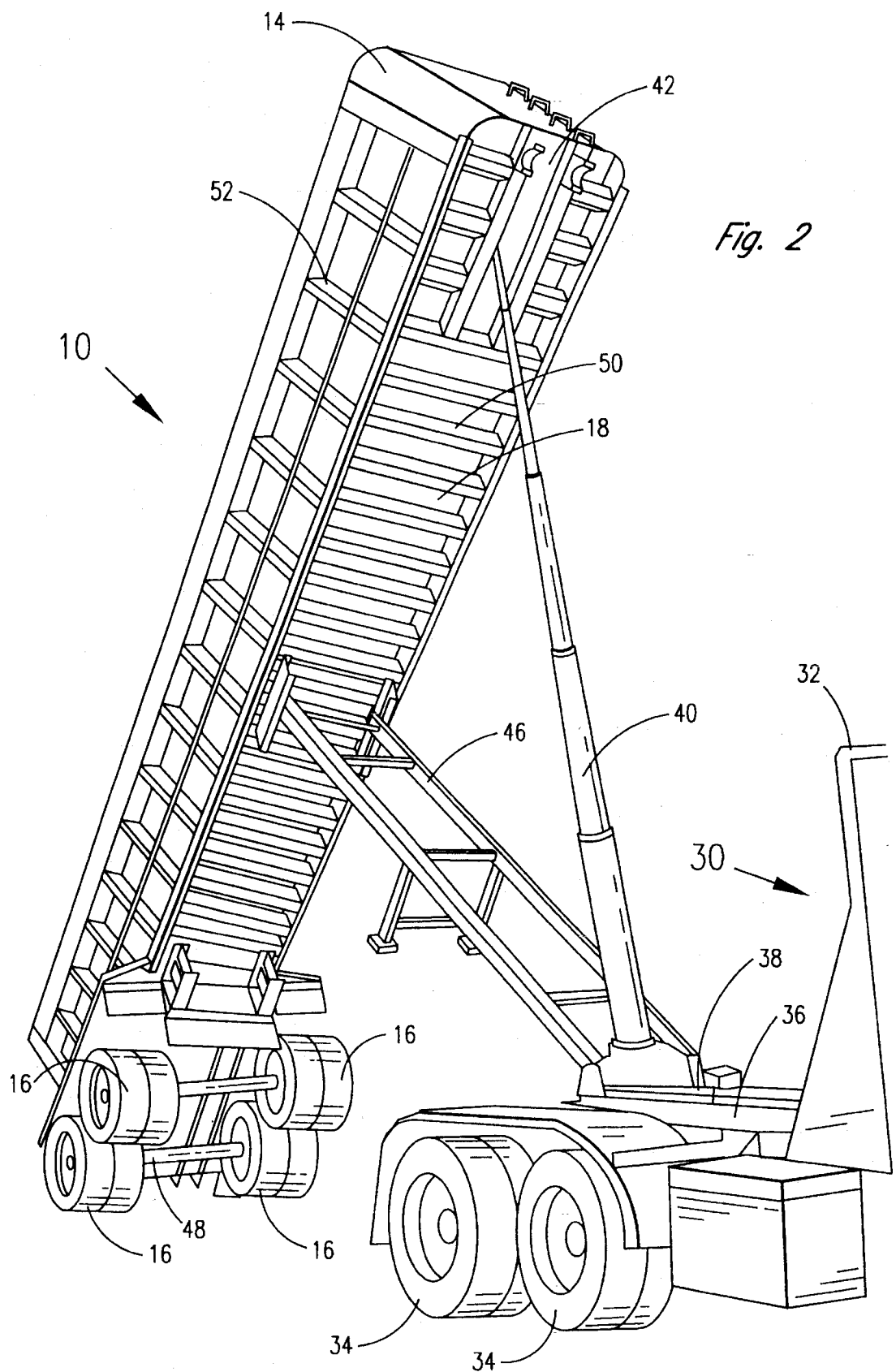
FIG. 2 is a perspective view of the double tapered trailer shown in FIG. 1 taken from a different perspective.

FIG. 2 illustrates the trailer 10 as shown in FIG. 1 from a different perspective. With the trailer 10 in the raised or lifted position, it will be observed that the front end 14 of the trailer is normally supported by a truck 30 during the loading and transporting position. With reference to FIG. 2 and continuing reference to FIG. 1, the trailer includes a truck cab 32 and wheels 34 that support a frame 36 and a coupler 38 to connect to the trailer.

The trailer 10 includes a lifting mechanism having a hydraulic telescoping cylinder 40 which is operated by controls (not shown) on the truck 30. The bottom floor 18 contains a recess 42 near the front end 12 to receive the top of the cylinder 40. The recess 42 in the bottom floor has a corresponding enclosure or hoist box 44. While the recess is not necessary for a hydraulic lift, this configuration is widely used to provide adequate space for the cylinder 40 when in the closed position.

For stability, a pair of lift arms 46 extend between the hoist and coupler 38 of the truck and the bottom floor 18. The lift arms 46 are pivotally connected to both the frame and the bottom floor to accommodate the lifting and lowering of the trailer.

During lifting and lowering, the trailer 10 tilts about the rear axle 48 of the rear wheels 16 which forms a transverse axis.

The bottom floor 18 is provided with a series of crossbraces 50 and the sidewalls are provided with a series of side braces 52 for added strength and stability.

Figure 3:
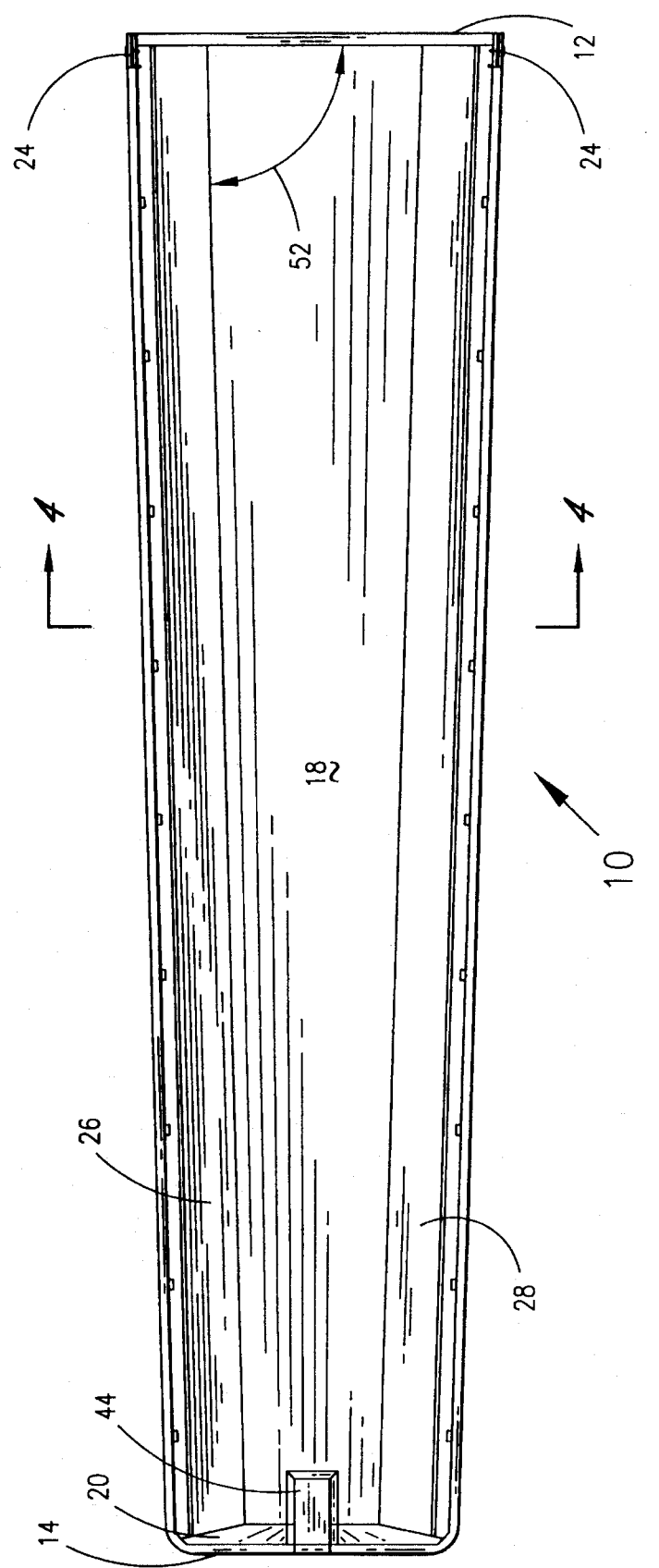
FIG. 3 is a top view of the double tapered trailer shown in FIG. 1 apart from the truck.

FIG. 3 is a top view of the trailer 10 apart from the truck 30. It will be observed that the bottom floor is not in a rectangular shape. Rather, the bottom floor is tapered between the front end 14 and the rear end 12. The bottom floor is wider at the rear end 12 than at the front end 14. Stated another way, the bottom floor is narrower at the front end and tapers gradually to a wider floor at the rear end.

In the present embodiment, the entire length of the floor is approximately 39 feet. The bottom floor is 42 inches wide at the front end and 48 inches wide at the rear end. The angle, illustrated by arrow 53, is approximately 89.6 degrees. Accordingly, the bottom floor extends from the front toward the rear at an angle of 90.4 degrees to align parallel to the longitudinal center line of the trailer. An angle between 90 and 91 degrees is known to work adequately.

By use of the tapered bottom floor, the load in the trailer 10 is encouraged to slide out of the rear end when the trailer is tilted. Since the rear end is larger than the front end, the sidewalls 26 and 28 play less of a role in restricting the load of materials as it exits the rear end of the trailer. Additionally, the amount of wear on the sidewalls is reduced.

Figure 4:
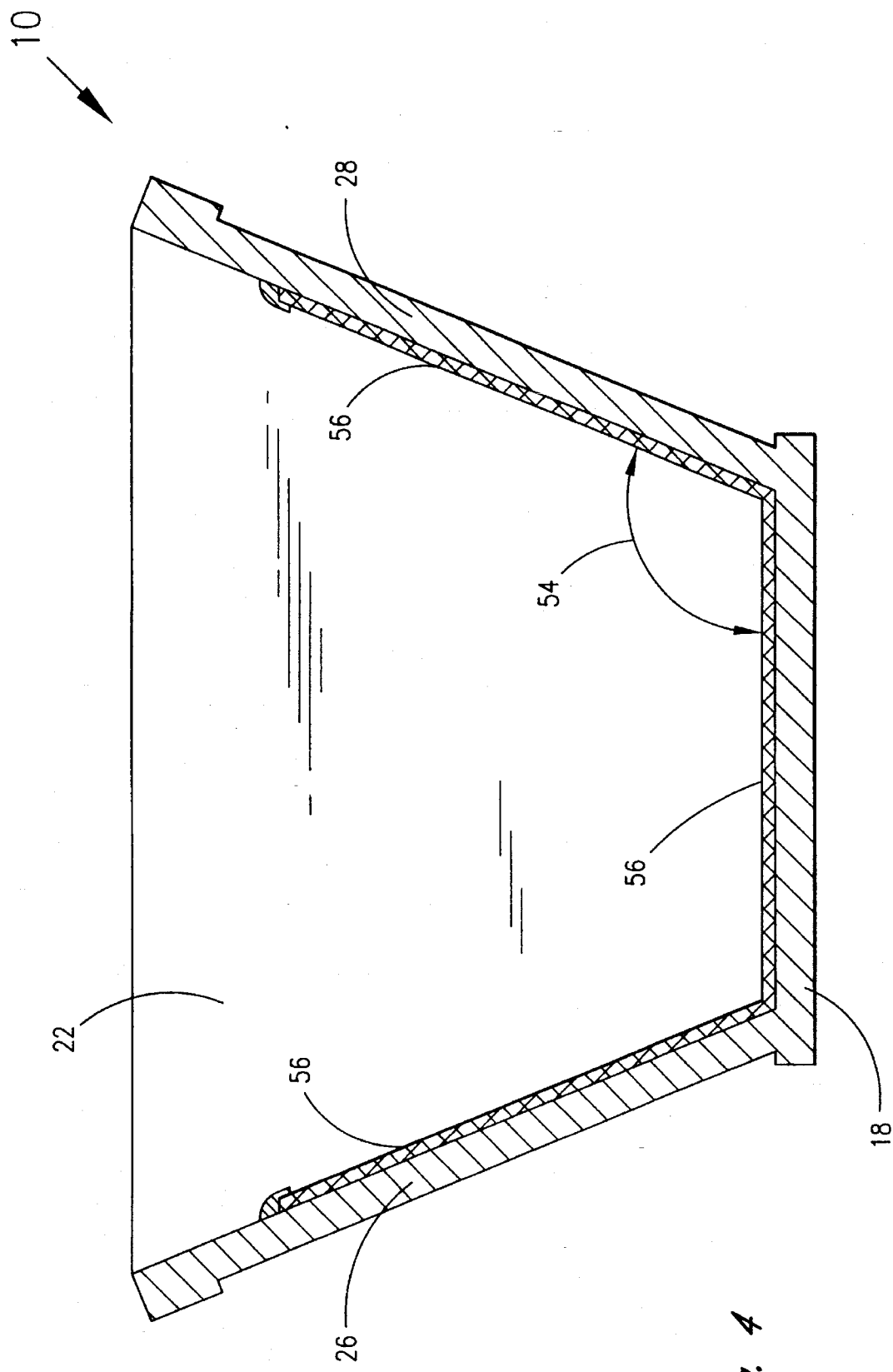
FIG. 4 is a sectional view of the double tapered trailer taken along section lines 4—4 of FIG. 3.

FIG. 4 is a sectional view taken along section line 4—4 of FIG. 3. It will be observed that the sidewalls are not vertical to the bottom floor 18. Rather, the sidewalls 26 and 28 extend upward at an obtuse angle to the bottom floor. In the present embodiment, the obtuse angle formed by the arrow 54 is between 111 degrees and 112 degrees. The bottom floor 18 is approximately four feet wide, while the distance between the sidewalls at the top is approximately eight feet wide. The use of angled sidewalls serve to center the load of materials in the trailer both during transportation and during unloading.

The combination of these two—namely, the tapered bottom floor from front to rear and the obtuse angled sidewalls—not only promotes the load to be centered so that it will not tip over during lifting or lowering but also encourages the load to be dumped to the rear due to the force of gravity.

As seen in FIG. 4, the sidewalls and the bottom may be lined with a lower friction material such as a plastic liner 56 which promotes sliding of the load.

An additional option for an alternate embodiment may be provided. The sidewalls 26 and 28 may be tapered from the front 14 to the rear 12 (not shown). In other words, the sidewalls 26 and 28 would be taller or larger near the front end 14 than near the rear end 12. This would serve to allow more of the load to be placed toward the front of the trailer. It will be recalled that the bottom floor 18 is narrower in the front than in the rear. Accordingly, this will serve to more evenly distribute the load from front to rear.

To unload the trailer, the truck and trailer are moved to a desired site so that the rear end 12 is aligned with the desired location. The rear hinges of the tail gate are unlocked.

In summary, the trailer retains a proper center of gravity while, at the same time, encouraging unloading of the materials in the trailer.

Whereas, the present invention has been described in relation to the drawings attached hereto, it should be understood that other and further modifications, apart from those shown or suggested herein, may be made within the spirit and scope of this invention.

What is claimed is:

1. A trailer for a dumping vehicle, said trailer having a front and having a rear for unloading of materials, which trailer comprises:

a tapered bottom floor extending between said front and said rear, said bottom floor at said rear wider than at said front;

a pair of opposed sidewalls extending from said bottom floor, each said sidewall at a constant, obtuse angle to said bottom floor, wherein each said side wall is taller at said front end than at said rear end;

lifting means to lift and to lower said front end of said trailer including a hydraulic telescoping cylinder and means to tilt said trailer near said rear of said trailer about an axis transverse to said trailer; and a recess in said trailer front for said hydraulic telescoping cylinder.

2. A trailer for a dumping vehicle as set forth in claim 1 wherein each said sidewall is at an obtuse angle to said bottom floor of between 111 degrees and 112 degrees.

3. A trailer for a dumping vehicle as set forth in claim 1 wherein said bottom floor extends from said front toward said rear at an angle greater than 90 degrees and less than 91 degrees to a line parallel to the longitudinal center line of the trailer.

* * * * *